(12) United States Patent
Karacali-Akyamac et al.

(10) Patent No.: US 7,953,023 B2
(45) Date of Patent: May 31, 2011

(54) ADAPTIVE PARTITIONING OF TRAFFIC WITHOUT ADDITIONAL PROBE TRAFFIC

(75) Inventors: Bengi Karacali-Akyamac, Bridgewater, NJ (US); Mark John Karol, Fair Haven, NJ (US); Parameshwaran Krishnan, Basking Ridge, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 131 days.

(21) Appl. No.: 12/271,196

(22) Filed: Nov. 14, 2008

(65) Prior Publication Data

US 2010/0124262 A1  May 20, 2010

(51) Int. Cl.
*H04B 17/00* (2006.01)
(52) U.S. Cl. ........ 370/252; 370/238; 370/336; 375/224; 375/347
(58) Field of Classification Search .................. 370/238, 370/252, 344, 336; 455/452.2, 512
See application file for complete search history.

(56) References Cited

U.S. PATENT DOCUMENTS

| 2005/0159166 A1* | 7/2005 | Jonsson et al. ............. 455/452.2 |
| 2006/0193295 A1 | 8/2006 | White et al. |
| 2007/0248012 A1 | 10/2007 | Glinsman et al. |
| 2008/0198814 A1* | 8/2008 | Wengerter et al. ............ 370/336 |
| 2008/0214220 A1* | 9/2008 | Beziot et al. .................. 455/512 |
| 2009/0175172 A1* | 7/2009 | Prytz et al. .................... 370/238 |

FOREIGN PATENT DOCUMENTS

| EP | 1492280 A1 | 12/2004 |
| EP | 1750405 A1 | 2/2007 |
| WO | 0180510 A1 | 10/2001 |
| WO | 03001702 A1 | 1/2003 |

OTHER PUBLICATIONS

Voisey, Daniel, "GB Application No. GB0916732.1 Office Action Dec. 14, 2009",, Publisher: UK IPO, Published in: GB.
Loechel, Dr., "DE Application No. 10 2009 043 282.5-31 Office Action Jan. 18, 2011",, Publisher: DPMA, Published in: DE.

* cited by examiner

*Primary Examiner* — Robert W Wilson
*Assistant Examiner* — Mohamed Kamara
(74) *Attorney, Agent, or Firm* — DeMont & Breyer, LLC

(57) ABSTRACT

A method is disclosed for adaptively and intelligently partitioning traffic among a plurality of communications channels, without injecting probe traffic into any of the channels. In accordance with the illustrative embodiment, a source node transmits traffic to a receiving node via K communications channels in accordance with partition coefficients $\alpha_1, \ldots, \alpha_K$, and the source node receives information regarding the quality of service (QoS) provided by each of the communications channels. The source node adjusts the values of the partition coefficients $\alpha_1, \ldots, \alpha_K$ adaptively based on: the current channel QoS information, prior channel QoS information, the prior values of $\alpha_1, \ldots, \alpha_K$, and a measure of channel independence for one or more pairs of communications channels.

20 Claims, 3 Drawing Sheets

ADAPTIVE PARTITIONING OF TRAFFIC WITHOUT ADDITIONAL PROBE TRAFFIC

FIELD OF THE INVENTION

The present invention relates to telecommunications in general, and, more particularly, to adaptive traffic partitioning.

BACKGROUND OF THE INVENTION

When information is transmitted from one node (e.g., a computer, a telecommunications terminal, a switch, a router, etc.) to another node via a communications channel, the performance of the channel can vary unpredictably due to channel loss, jitter, noise, and so forth. A well-known technique for monitoring the performance of a communications channel, and how the performance varies over time, is to inject additional traffic, known as probe traffic, into the transmission. A disadvantage of this technique, however, is the associated overhead and reduced throughput that results from the introduction of additional traffic into the communications channel.

SUMMARY OF THE INVENTION

The present invention pertains to situations in which there is a plurality of communications channels available for a source node to transmit information to a receiving node. In particular, the present invention provides a technique for adaptively and intelligently partitioning traffic among the communications channels, without injecting probe traffic into any of the channels. The present invention is therefore capable of adjusting the partitioning of traffic over time in order to maintain maximum performance, without any of the disadvantages associated with the introduction of probe traffic.

In accordance with the illustrative embodiment of the present invention, a source node transmits traffic to a receiving node via K communications channels in accordance with partition coefficients $\alpha_1, \ldots, \alpha_K$, and the source node receives information regarding the quality of service (QoS) provided by each of the communications channels. The source node adjusts the values of the partition coefficients $\alpha_1, \ldots, \alpha_K$ adaptively based on:
 the current channel QoS information,
 prior channel QoS information,
 the prior values of $\alpha_1, \ldots, \alpha_K$, and
 a measure of channel independence for one or more pairs of communications channels where the measure of channel independence is based on at least one of:
 the extent to which traffic in a first channel affects traffic in a second channel,
 the extent to which traffic in a first channel affects quality of service of a second channel, and
 the extent to which a change in quality of service of a first channel affects the quality of service of a second channel.

In accordance with the illustrative embodiment, the channel QoS information is expressed as values of a quality-of-service metric (e.g., throughput, jitter, error rate, re-transmission frequency, some combination of two or more such metrics, etc.) for each of the channels. In addition, in the illustrative embodiment the measure of channel independence is a real-valued coefficient where a value of zero indicates that two channels are completely independent—i.e., that traffic and changes in QoS in one of the channels does not affect traffic or QoS in the other channel. Finally, in the illustrative embodiment partition coefficients $\alpha_1, \ldots, \alpha_K$ are real numbers in [0, 1] that indicate the fraction of traffic that is transmitted over each of the K communications channels $$\left(\text{i.e., } \sum_{i=1}^{K} \alpha_i = 1\right).$$

The illustrative embodiment comprises: receiving values $q_1, \ldots, q_K$ of a quality-of-service metric for K communications channels, wherein K is an integer greater than one, and wherein the values $q_1, \ldots, q_K$ are obtained without injecting any probe traffic into any of the K communications channels; and determining values for K coefficients $\alpha_1, \ldots, \alpha_K$ that quantify how subsequent traffic is to be partitioned among the K communications channels; wherein the determination of the coefficients $\alpha_1, \ldots, \alpha_K$ is based on: (i) the values $q_1, \ldots, q_K$, (ii) one or more previous values of the coefficients $\alpha_1, \ldots, \alpha_K$, and (iii) a measure of channel independence for one or more pairs of the K communications channels.

DETAILED DESCRIPTION

Figure 1:
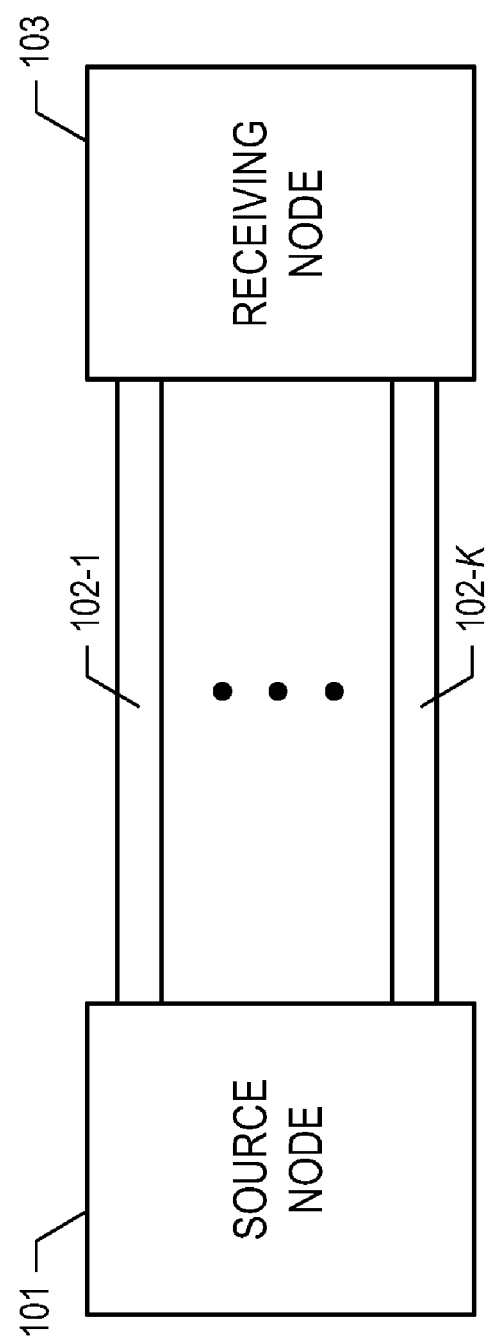
FIG. 1 depicts a schematic diagram of the salient elements of telecommunications system 100, in accordance with the illustrative embodiment of the present invention.

FIG. 1 depicts a schematic diagram of the salient elements of telecommunications system 100, in accordance with the illustrative embodiment of the present invention. As shown in FIG. 1, telecommunications system 100 comprises source node 101, communications channels 102-1 through 102-K, where K is an integer greater than one, and receiving node 103, interconnected as shown.

Communications channels 102-1 through 102-K are conduits for the transmission of information from source node 101 to receiving node 103, as is well-known in the art. In accordance with the illustrative embodiment, communications channels 102-1 through 102-K are bidirectional, and thus enable receiving node 103 to transmit information to source node 101 as well. As will be appreciated by those skilled in the art, however, in some embodiments of the present invention communications channels 102-1 through 102-K might instead be unidirectional (i.e., enabling transmission in only one direction from source node 101 to receiving node 103), and it will be clear to those skilled in the art, after reading this disclosure, how to adapt the method of FIG. 3, described below, for such embodiments of the present invention.

Source node 101 is one of a computer, a telecommunications terminal, a switch, a router, etc. that is capable of transmitting and receiving traffic via communications channels 102-1 through 102-K, and of performing tasks 310, 360, and 370, described below and with respect to FIG. 3. As will be appreciated by those skilled in the art, in alternative embodiments of the present invention in which communications channels 102-1 through 102-K are unidirectional, source node 101 is capable of transmitting, but not receiving, traffic via the channels.

Receiving node 103 is one of a computer, a telecommunications terminal, a switch, a router, etc. that is capable of transmitting and receiving traffic via communications channels 102-1 through 102-K, and of performing tasks 320 through 350, described below and with respect to FIG. 3. As will be appreciated by those skilled in the art, in alternative embodiments of the present invention in which communications channels 102-1 through 102-K are unidirectional, receiving node 103 is capable of receiving, but not transmitting, traffic via the channels.

Figure 2:
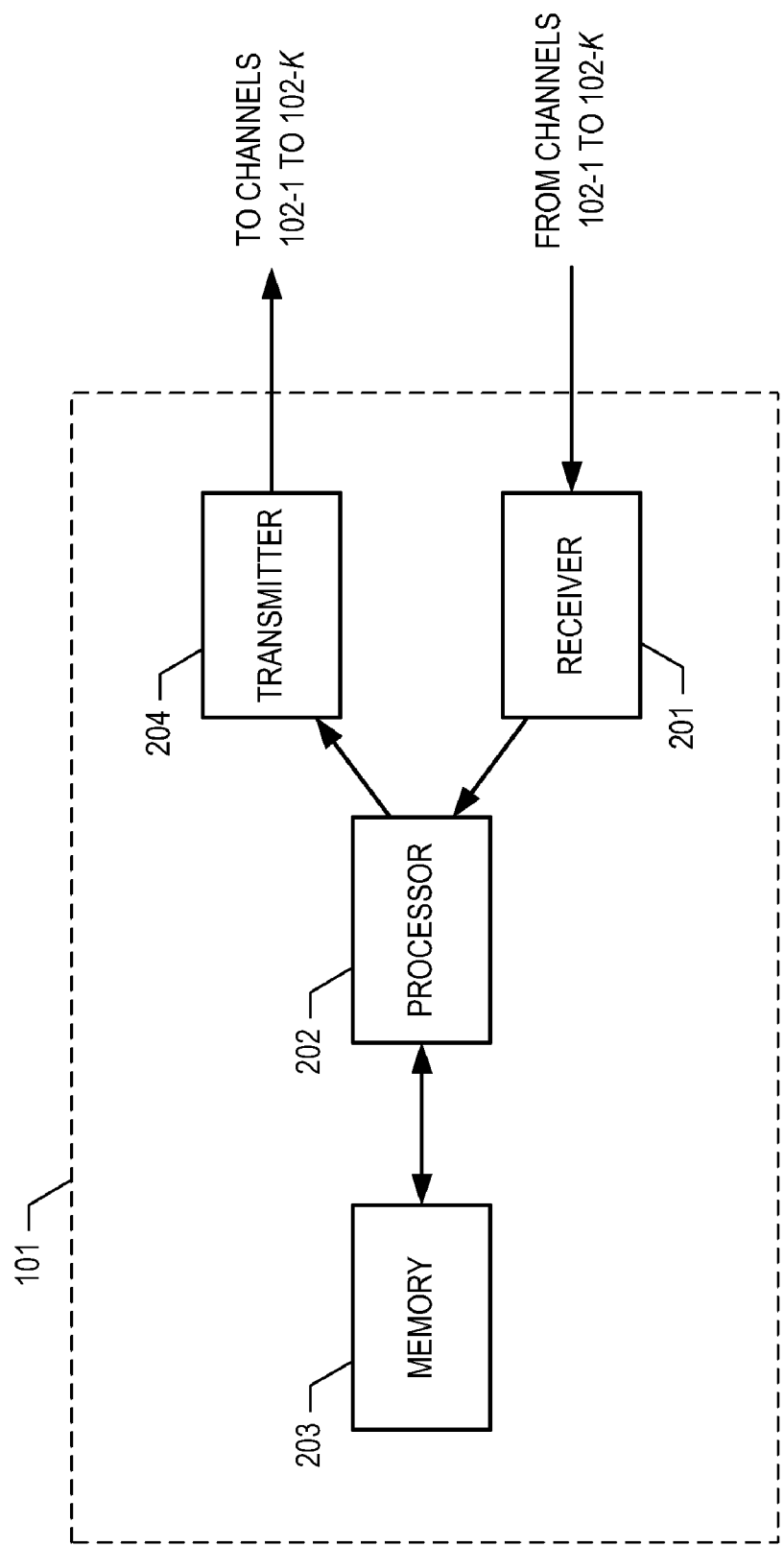
FIG. 2 depicts a schematic diagram of the salient elements of source node 101, as shown in FIG. 1, in accordance with the illustrative embodiment of the present invention.

FIG. 2 depicts a schematic diagram of the salient elements of source node 101, in accordance with the illustrative embodiment of the present invention. As shown in FIG. 2, source node 101 comprises receiver 201, processor 202, memory 203, and transmitter 204, interconnected as shown.

Receiver 201 is capable of receiving signals via communications channels 102-1 through 102-K and of forwarding information encoded in these signals to processor 202, in well-known fashion.

Processor 202 is a general-purpose processor that is capable of receiving information from receiver 201, of reading data from and writing data into memory 203, of executing instructions stored in memory 203, and of forwarding information to transmitter 204, in well-known fashion. As will be appreciated by those skilled in the art, in some alternative embodiments of the present invention processor 202 might be a special-purpose processor, rather than a general-purpose processor.

Memory 203 is capable of storing data and executable instructions, in well-known fashion, and might be any combination of random-access memory (RAM), flash memory, disk drive, etc. In accordance with the illustrative embodiment, memory 203 stores executable instructions corresponding to tasks 310, 360, and 370, described below and with respect to FIG. 3.

Transmitter 204 is capable of receiving information from processor 202, and of transmitting signals that encode this information via communications channels 102-1 through 102-K, in well-known fashion.

Figure 3:
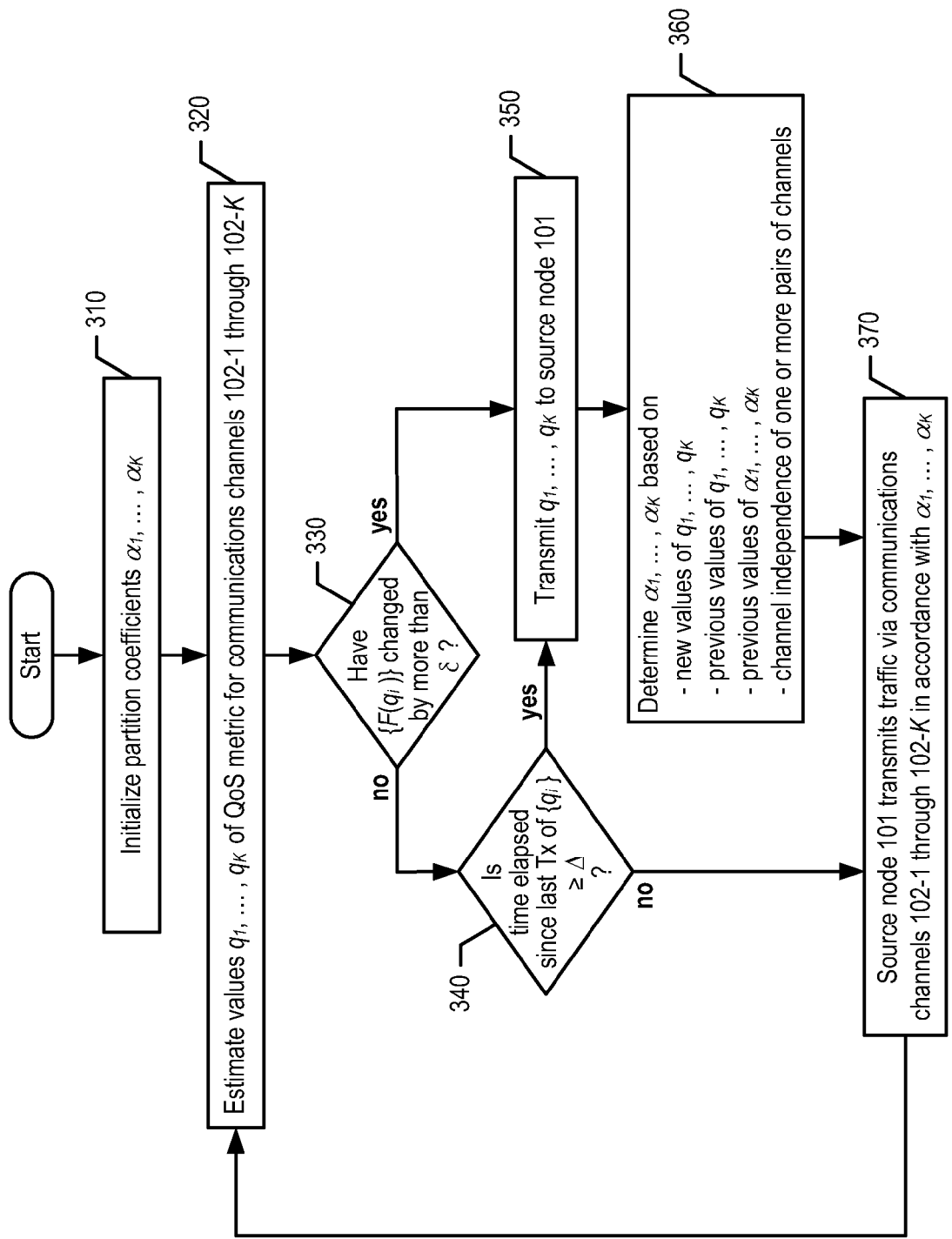
FIG. 3 depicts a flowchart of a method for adaptively partitioning traffic among communications channels 102-1 through 102-K, as shown in FIG. 1, in accordance with the illustrative embodiment of the present invention.

FIG. 3 depicts a flowchart of a method for adaptively partitioning traffic among communications channels 102-1 through 102-K, in accordance with the illustrative embodiment of the present invention. It will be clear to those skilled in the art, after reading this disclosure, which tasks depicted in FIG. 3 can be performed simultaneously or in a different order than that depicted.

At task 310, partition coefficients $\alpha_1, \ldots, \alpha_K$ are initialized. As will be appreciated by those skilled in the art, in some embodiments of the present invention the coefficients might be initialized with equal values (e.g., 1/K, etc.), while in some other embodiments of the present invention the coefficients might be initialized based on information such as historical quality of service (QoS) data for the channels, parameter specifications of the channels (e.g., bandwidth, etc.), etc.

At task 320, QoS metric values $q_1, \ldots, q_K$ are estimated for communications channels 102-1 through 102-K, in well-known fashion. As will be appreciated by those skilled in the art, in some embodiments of the present invention in which traffic is composed of Voice over Internet Protocol (VoIP) packets, the delay, loss, and jitter of the packets might be estimated, and an R-factor QoS metric that combines these parameters into a single value might then be computed. Alternatively, in some other embodiments of the present invention, other traffic characteristics such as latency or measured bandwidth might be estimated, and another type of QoS metric based on these characteristics might then be computed.

Task 330 determines whether $F(q_1), \ldots, F(q_K)$, where F is a function, differ from their previous values by more than a threshold $\delta$. As will be appreciated by those skilled in the art, in some embodiments F might simply be the identity function, while in some other embodiments F might be another type of function; moreover, the difference between new and previous values of $F(q_1), \ldots, F(q_K)$ might be computed in a variety of ways, such as the sum of the differences of the individual $F(q_i)$, the sum of the squares of the differences of the individual $F(q_i)$, the minimum difference over all of the $F(q_i)$, the maximum difference over all of the $F(q_i)$, and so forth. As will further be appreciated by those skilled in the art, the selection of an appropriate threshold value $\delta$ is a design decision that is typically best determined in each particular implementation.

If the new values differ from the old values by more than threshold $\delta$, then execution continues at task 350, otherwise execution proceeds to task 340.

Task 340 checks whether at least $\Delta$ seconds have elapsed since the last time values $q_1, \ldots, q_K$ were transmitted to source node 101 at task 350—or, if task 350 has not yet been executed, since the method of FIG. 3 began. If $\Delta$ or more seconds have elapsed, then execution proceeds to task 350, otherwise execution continues at task 370. As will be appreciated by those skilled in the art, $\Delta$ is a positive real number whose value is best determined in each particular implementation.

At task 350, values $q_1, \ldots, q_K$ are transmitted to source node 101, in well-known fashion. In accordance with the illustrative embodiment, values $q_1, \ldots, q_K$ are transmitted to source node 101 via communications channels 102-1 through 102-K. However, as will be appreciated by those skilled in the art, in some other embodiments of the present invention values $q_1, \ldots, q_K$ might be transmitted in an alternative fashion (e.g., via some other communications channel or network not depicted in the drawings, etc.), and it will be clear to those skilled in the art, after reading this disclosure, how to make and use such embodiments of the present invention.

At task 360, new values for partition coefficients $\alpha_1, \ldots, \alpha_K$ are determined based on:
  the new values of $q_1, \ldots, q_K$ transmitted to source node 101,
  previous values of $q_1, \ldots, q_K$,
  previous values of $\alpha_1, \ldots, \alpha_K$, and
  a measure of channel independence for one or more pairs of communications channels 102-1 through 102-K.

In accordance with illustrative embodiment, previous values of $\alpha_1, \ldots, \alpha_K$ are considered at task 360 in order to smooth out changes of $\alpha_1, \ldots, \alpha_K$ over time. As will be appreciated by those skilled in the art, there are a variety of techniques known in the art for achieving such smoothing, such as a moving average, a maximum incremental change, and so forth, and the parameters associated with such techniques (e.g., the size of the moving average window, the value of the maximum incremental change, etc.) can be set to control the degree of smoothing (or alternatively, how aggressively the values of $\alpha_1, \ldots, \alpha_K$ change over time). Similarly, previous values of $q_1, \ldots, q_K$ are also considered at task 360 to smooth out changes over time.

In accordance with illustrative embodiment, the measure of channel independence is based on at least one of:
  the extent to which traffic in a first channel affects traffic in a second channel,
  the extent to which traffic in a first channel affects quality of service of a second channel, and the extent to which a change in quality of service of a first channel affects the quality of service of a second channel.

In particular, in the illustrative embodiment the measure of channel independence is a real number ρ, where ρ=0 indicates that two channels are completely independent, which means that:

an increase in traffic in one of the channels has no effect on the traffic or quality of service of the other channel, and a change in quality of service of one of the channels has no effect on the quality of service of the other channel.

Conversely, a non-zero value of ρ indicates that two channels are dependent, where ρ=1 means that:

an increase in traffic in one of the channels results in an equal decrease of traffic in the other channel, and a decrease in quality of service in one of the channels results in an equal decrease of quality of service in the other channel.

Similarly, an arbitrary non-zero value of ρ reflects how much a change in traffic/QoS in one channel affects traffic/QoS in the other channel, where both ρ<1 and ρ>1 are possible.

As will be appreciated by those skilled in the art, the measure of channel independence might be either non-symmetric or symmetric, where the former case corresponds to an ordered pair of channels, and the latter case corresponds to an un-ordered pair of channels. Moreover, as will be appreciated by those skilled in the art, some other embodiments of the present invention might employ a different measure of channel independence than that of the illustrative embodiment, and it will be clear to those skilled in the art, after reading this disclosure, how to make and use such embodiments.

As will further be appreciated by those skilled in the art, there are a variety of ways in which the particular values of partition coefficients $\alpha_1, \ldots, \alpha_K$ might be set. For example, in some embodiments values $\alpha_1, \ldots, \alpha_K$ might be set proportional to the QoS values $q_1, \ldots, q_K$ (subject, possibly, to the smoothing influences of prior values), while in some other embodiments of the present invention the values of $\alpha_1, \ldots, \alpha_K$ might be based on a ranking of values $q_1, \ldots, q_K$, irrespective of the relative magnitudes of $q_1, \ldots, q_K$. For example, suppose K=3, $q_1=2$ (the particular units are immaterial), $q_2=5$, and $q_3=3$. In the former case, the partition coefficients would be set as $\alpha_1=0.2$, $\alpha_2=0.5$, and $\alpha_3=0.3$, while in the latter case, the partition coefficients might be set as, say, $\alpha_1=0.3$, $\alpha_2=0.37$, and $\alpha_3=0.33$.

As will appreciated by those skilled in the art, there are yet other ways that the values of partition coefficients $\alpha_1, \ldots, \alpha_K$ might be set. For example, in some embodiments of the present invention, a geometric partition might be employed so that a disproportionately large fraction of traffic is transmitted over the channel with the best quality of service. Furthermore, in some embodiments of the present invention, values $\alpha_1, \ldots, \alpha_K$ might be set so that a very small fraction, or even zero, traffic is transmitted over one or more particular channels. In the case that zero traffic is transmitted over a particular channel (i.e., $\alpha_i=0$ for some $1 \leq i \leq N$), it might be advantageous to periodically set $\alpha_i > 0$ so that the quality of service of the channel is periodically measured.

At task 370, source node 101 transmits traffic via communications channels 102-1 through 102-K in accordance with partition coefficients $\alpha_1, \ldots, \alpha_K$ (i.e., the traffic is distributed among the channels such that communications channel 102-i receives fraction $\alpha_i$ of the traffic, for all $i \in \{1, \ldots, K\}$).

As will be appreciated by those skilled in the art, although in the illustrative embodiment tasks 310, 360, and 370 are performed by source node 101, in some other embodiments of the present invention some or all of these tasks might be performed by some other entity, such as a third node that is capable of communicating with source node 101 and receiving node 103. Similarly, although in the illustrative embodiment tasks 320 through 350 are performed by receiving node 103, in some other embodiments of the present invention some or all of these tasks might be performed by some other entity—perhaps the same as the entity that performs tasks 310, 360, and 370, or perhaps yet another entity (e.g., a fourth node, etc.). In any case, it will be clear to those skilled in the art, after reading this disclosure, how to make and use such alternative embodiments of the present invention.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  receiving values $q_1, \ldots, q_K$ of a quality-of-service metric for K communications channels that connect a first node with a second node, wherein K is an integer greater than one, and wherein said values $q_1, \ldots, q_K$ are obtained without injecting any probe traffic into any of said K communications channels;
  determining values for K coefficients $\alpha_1, \ldots, \alpha_K$ that quantify how subsequent traffic is to be partitioned among said K communications channels;
  wherein the determination of said coefficients $\alpha_1, \ldots, \alpha_K$ is based on:
    (i) said values, $q_1, \ldots, q_K$,
    (ii) one or more previous values of said coefficients $\alpha_1, \ldots, \alpha_K$, and
    (iii) a measure of channel independence for one or more pairs of said K communications channels; and
  transmitting traffic from said first node to said second node via said K communications channels, wherein said traffic is distributed among said K communications channels based on the values of said coefficients $\alpha_1, \ldots, \alpha_K$.

2. The method of claim 1 wherein said measure of channel independence is based on at least one of:
  (i) the extent to which traffic in a first channel affects traffic in a second channel,
  (ii) the extent to which traffic in a first channel affects quality of service of a second channel, and
  (iii) the extent to which a change in quality of service of a first channel affects quality of service of a second channel.

3. The method of claim 1 further comprising transmitting traffic via said K communications channels in accordance with said K coefficients $\alpha_1, \ldots, \alpha_K$.

4. The method of claim 1 wherein said K communications channels enable transmission of traffic from a source node to a receiving node.

5. The method of claim 4 wherein said values $q_1, \ldots, q_K$ are estimated by said receiving node.

6. The method of claim 5 wherein said values $q_1, \ldots, q_K$ are transmitted to said source node via one or more of said K communications channels.

7. The method of claim 1 wherein said values $q_1, \ldots, q_K$ are transmitted periodically.

8. The method of claim 1 wherein said values $q_1, \ldots, q_K$ are transmitted in response to a change in $F(q_1), \ldots, F(q_K)$ that exceeds a threshold, and wherein F is a function.

9. The method of claim 1 wherein the determination of said K coefficients $\alpha_1, \ldots, \alpha_K$ sets the values of $\alpha_1, \ldots, \alpha_K$ proportionally to said values $q_1, \ldots, q_K$.

10. The method of claim 1 wherein the determination of said K coefficients $\alpha_1, \ldots, \alpha_K$ is based on a ranking of said values $q_1, \ldots, q_K$.

11. An apparatus comprising:
- a receiver for receiving values $q_1, \ldots, q_K$ of a quality-of-service metric for K communications channels, wherein K is an integer greater than one, and wherein said values $q_1, \ldots, q_K$ are obtained without injecting any probe traffic into any of said K communications channels;
- a processor for determining values for K coefficients $\alpha_1, \ldots, \alpha_K$ that quantify how subsequent traffic is to be partitioned among said K communications channels; and
- a transmitter for transmitting traffic via said K communications channels, wherein said traffic is distributed among said K communications channels based on the values of said coefficients $\alpha_1, \ldots, \alpha_K$;
- wherein the determination of said coefficients $\alpha_1, \ldots, \alpha_K$ is based on:
  - (i) said values $q_1, \ldots, q_K$,
  - (ii) one or more previous values of said coefficients $\alpha_1, \ldots, \alpha_K$, and
  - (iii) a measure of channel independence for one or more pairs of said K communications channels.

12. The apparatus of claim 11 wherein said measure of channel independence is based on at least one of:
- (i) the extent to which traffic in a first channel affects traffic in a second channel,
- (ii) the extent to which traffic in a first channel affects quality of service of a second channel, and
- (iii) the extent to which a change in quality of service of a first channel affects quality of service of a second channel.

13. The apparatus of claim 11 further comprising a transmitter for transmitting traffic via said K communications channels in accordance with said K coefficients $\alpha_1, \ldots, \alpha_K$.

14. The apparatus of claim 13 wherein said transmitter transmits traffic via said K communications channels to a receiving node.

15. The apparatus of claim 14 wherein said values $q_1, \ldots, q_K$ are estimated by said receiving node.

16. The apparatus of claim 11 wherein said values $q_1, \ldots, q_K$ are received via said K communications channels.

17. The apparatus of claim 11 wherein said values $q_1, \ldots, q_K$ are received periodically.

18. The apparatus of claim 11 wherein said values $q_1, \ldots, q_K$ are received in response to a change in $F(q_1), \ldots, F(q_K)$ that exceeds a threshold, and wherein F is a function.

19. The apparatus of claim 11 wherein the determination of said K coefficients $\alpha_1, \ldots, \alpha_K$ sets the values of $\alpha_1, \ldots, \alpha_K$ proportionally to said values $q_1, \ldots, q_K$.

20. The apparatus of claim 11 wherein the determination of said K coefficients $\alpha_1, \ldots, \alpha_K$ is based on a ranking of said values $q_1, \ldots, q_K$.

* * * * *